United States Patent
Bowser

(10) Patent No.: US 8,002,320 B2
(45) Date of Patent: Aug. 23, 2011

(54) TONGS WITH MAGNET

(76) Inventor: Elliott Bowser, Slidell, LA (US)

(*) Notice: Subject to any disclaimer, the term of this patent is extended or adjusted under 35 U.S.C. 154(b) by 409 days.

(21) Appl. No.: 12/220,583

(22) Filed: Jul. 25, 2008

(65) Prior Publication Data
US 2010/0019521 A1      Jan. 28, 2010

(51) Int. Cl.
*B65G 7/12* (2006.01)
(52) U.S. Cl. .................... 294/16; 29/268; 7/127; 7/128; 294/99.2
(58) Field of Classification Search ............ 294/16, 294/99.2; 7/128, 127; 29/268, 270
See application file for complete search history.

(56) References Cited

U.S. PATENT DOCUMENTS

| | | | | |
|---|---|---|---|---|
| 3,304,111 A | * | 2/1967 | Kauh et al. | 294/99.2 |
| 5,590,590 A | * | 1/1997 | Zammit | 99/495 |
| D396,612 S | * | 8/1998 | Lillelund et al. | D7/686 |
| 6,536,819 B2 | * | 3/2003 | Wang et al. | 294/16 |
| 6,869,117 B1 | * | 3/2005 | Blum | 294/16 |
| 2009/0167040 A1 | * | 7/2009 | Tong et al. | 294/99.2 |

FOREIGN PATENT DOCUMENTS

| | | | | |
|---|---|---|---|---|
| JP | 09103353 A | * | 4/1997 | |
| JP | 11206542 A | * | 8/1999 | |
| JP | 11206543 A | * | 8/1999 | |

* cited by examiner

*Primary Examiner* — Saúl J Rodríguez
*Assistant Examiner* — Stephen Vu
(74) *Attorney, Agent, or Firm* — Keaty Law Firm

(57) ABSTRACT

A tongs for manually grasping items has two elongate tong arms pivotally joined together with a pair of magnet members. The arms pivot between an open position when the magnet members are joined together and a closed position when the magnet members are separated. A user can easily break the connection of the magnet members and separate the two arms, making it easier to store and clean the tongs.

19 Claims, 3 Drawing Sheets

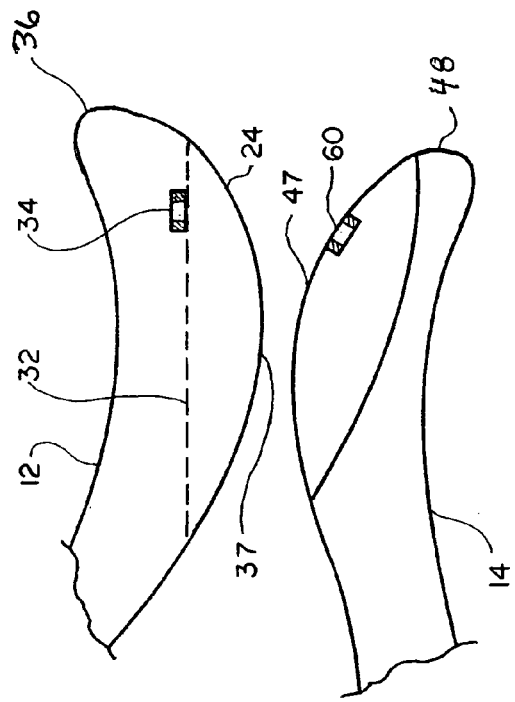
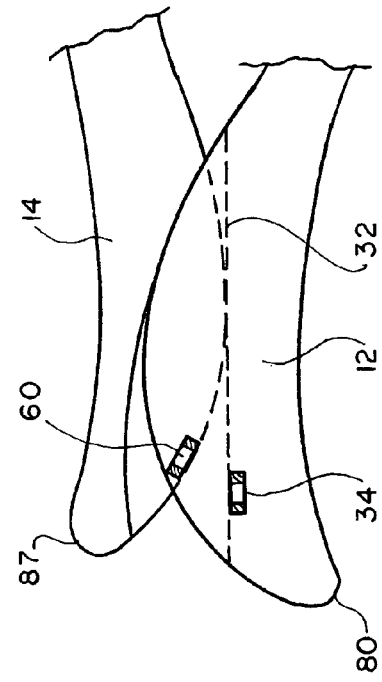
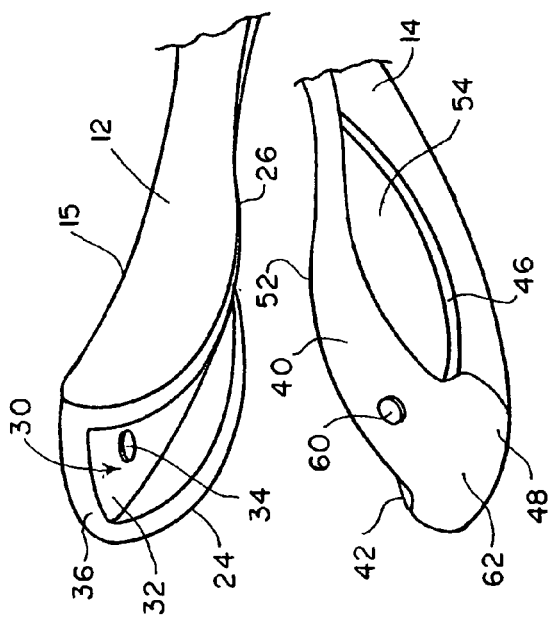
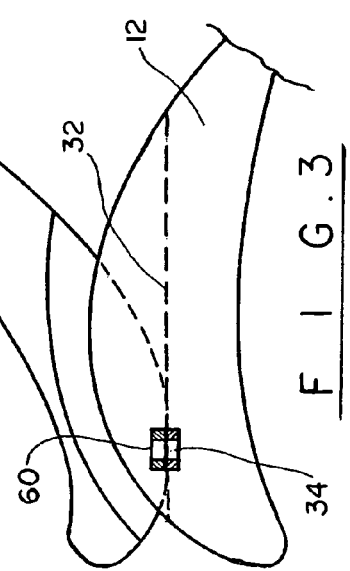

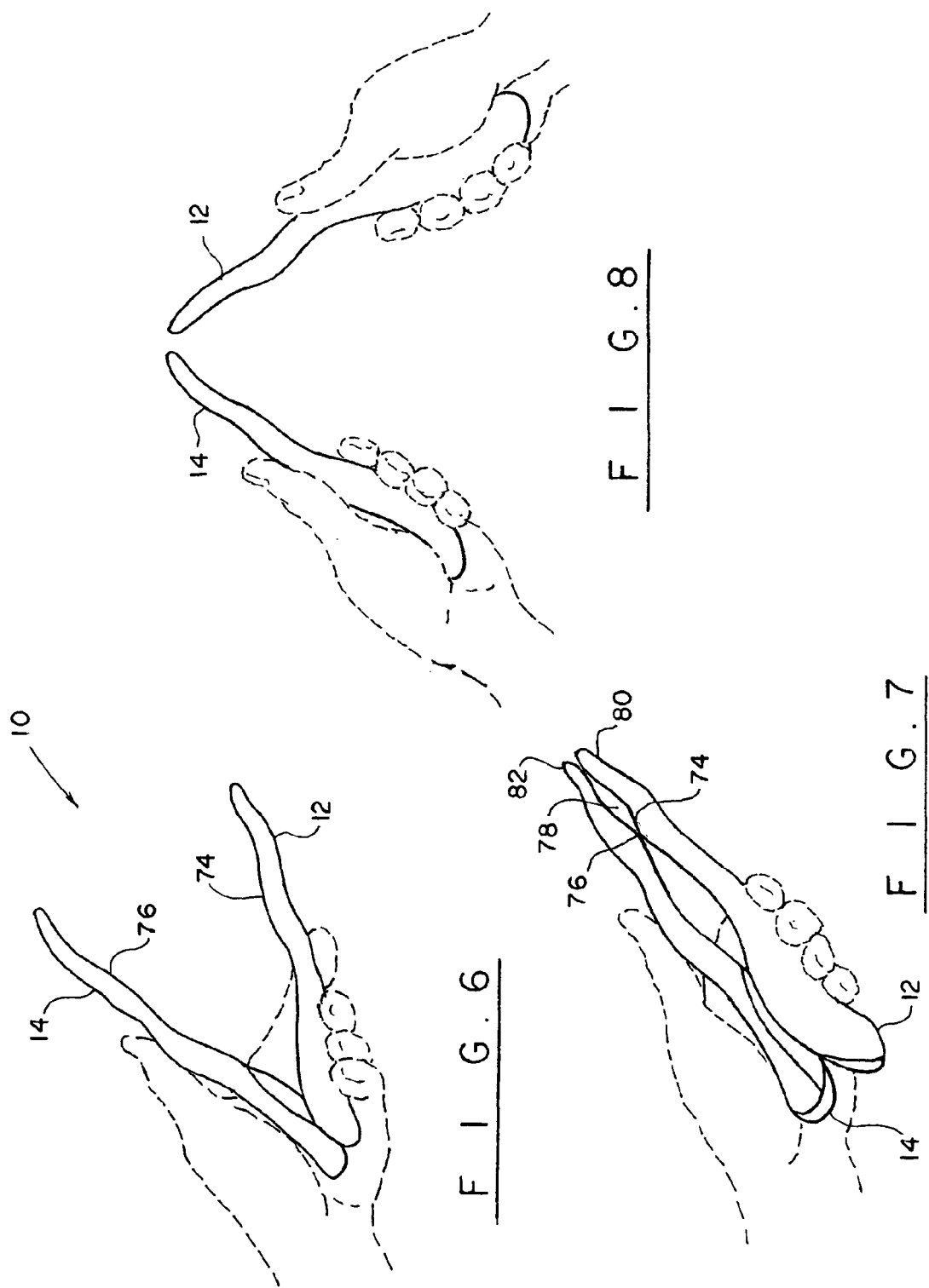

TONGS WITH MAGNET

FIELD OF THE INVENTION

The present invention relates to utensils for grasping items, and more particularly to kitchen utensils with a magnet.

BACKGROUND OF THE INVENTION

Spring-armed utensils are common fixtures in every kitchen. They are most typically used to grasp items that may not be picked up by hand, for instance when the item is too hot for a hand to hold or it would be unsanitary to do so.

Such utensils are difficult to properly clean within the hinge joint. They are not intended to be disassembled and are thus undesirable for handling food since they provide many inaccessible crevices for food particles and bacteria to accumulate. Thus, when debris becomes trapped within the hinge of traditional spring-loaded utensils it is very difficult to remove and creates an unsanitary environment for food preparation.

It is also awkward to store spring-armed utensils when not in use. The arm span is widest when the utensils are at rest, which takes up excessive space when stored in a drawer or countertop canister. Spring-armed utensils cannot be easily disassembled or reassembled; therefore the arms are constantly in the widest open position unless force is exerted to keep them closed.

Many contemporary spring-armed utensils now have locking mechanisms to attempt to correct the storage problem, but the locks can cause more problems than they solve. Locking spring-armed utensils may either lock or unlock too easily or not easily enough when in use, which hampers the utensil's functionality more than the locks help with storage capacity. Such locks may also spring open when stored if not engaged properly, thus negating the spring lock's primary purpose.

Further, because of the constant opposing force exerted by spring-based hinges, the hinge-end elements within spring-arm designs are prone to wear and tear and many spring-arm locking mechanisms further accelerate wear to the hinge. Additionally, spring-arm utensils, with or without locks, can incorporate complicated hardware and excessive moving parts that add to manufacturing difficulty and expense.

For all the aforementioned reasons, existing spring-armed utensils are less than ideal for daily kitchen use. Ideally, the utensil hinge should be usable with one hand, without the need to worry about whether it is in a locked or unlocked position, should be easily stored without the nuisance of springing open while in rest, and should be easily cleaned for more sanitary food preparation.

SUMMARY OF THE INVENTION

It is, therefore, an object of the present invention to provide a strong and durable utensil that can be easily assembled and disassembled when not in use.

Is it another object of the invention to provide tongs that use magnets for pivotal action at the hinge end.

It is a further object of the present invention to provide kitchen tongs that can be disassembled and cleaned before stored.

These and other objects of the present invention are achieved through a provision of a tongs device for manually grasping items, which comprises two elongate tong arms pivotally joined together with a pair of magnet members, the tong arms pivoting between an open position when the magnet members are joined together and a closed position when the magnet members are separated. A user can easily break the connection of the magnet members and separate the two arms, making it easier to store and clean the tongs.

BRIEF DESCRIPTION OF THE DRAWINGS

So that the features of the present invention can be understood in detail, reference will now be made to the drawings, wherein like parts are designated by like numerals and wherein

FIG. 2 is a detail perspective view of the hinge portions of the tongs arms.

FIG. 3 is a plan view of the hinge portions showing the magnets of the hinge portions engaged.

FIG. 4 a plan view of the hinge portions showing the magnets of the hinge portions disengaged.

FIG. 5 is a plan view illustrating orientation of the hinge portions when the distant ends of the arms are in a closed position grasping an object.

FIG. 6 is a perspective view illustrating the use of the tongs of the present invention, with the arms are in an open position.

FIG. 7 is a perspective view illustrating the use of the tongs of the present invention, with the distant ends of the tongs arms in a close position.

FIG. 8 is a perspective view of the arms of the tongs of the present invention held in a disassembled position by a user.

DETAIL DESCRIPTION OF THE INVENTION

Figure 1:
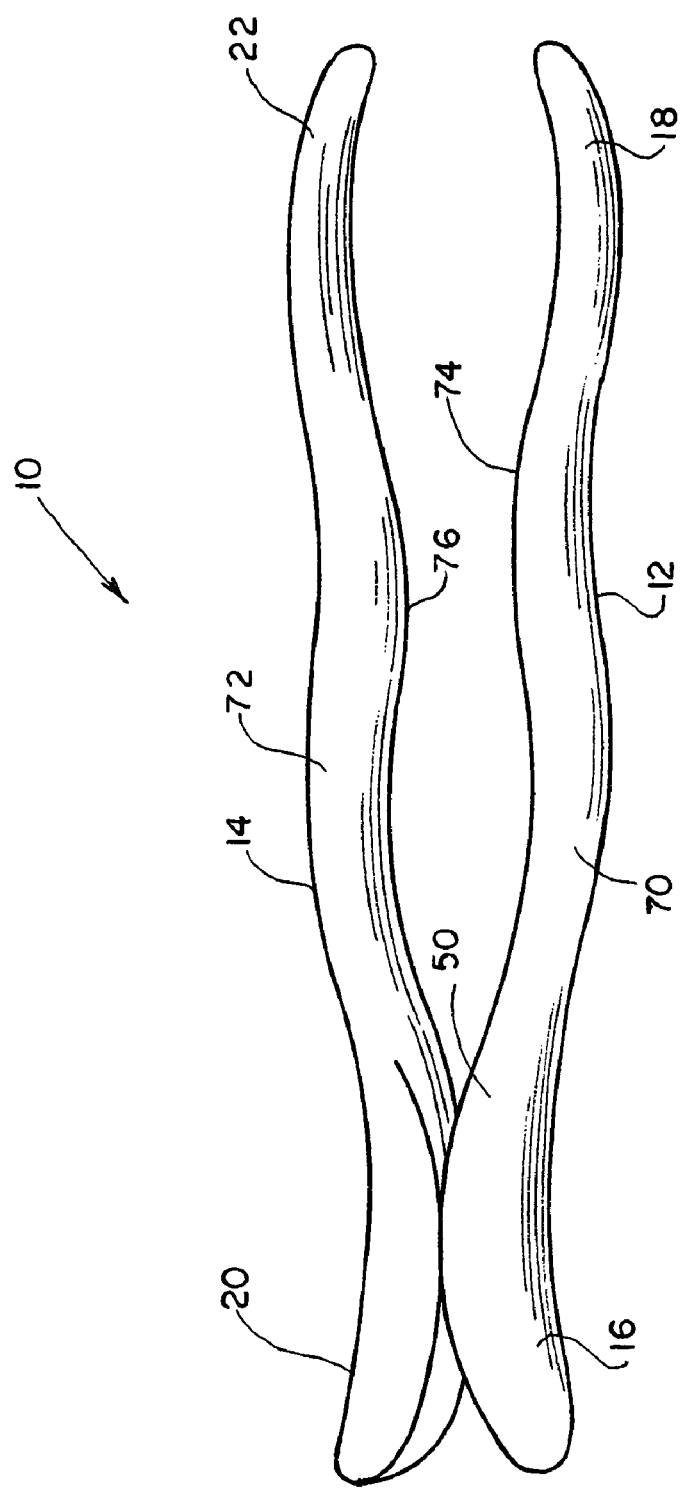
FIG. 1 is a perspective view of the tongs in accordance with the present invention.

Turning now to the drawings in more detail, numeral 10 designates the tongs in accordance with the present invention. The tongs 10 comprise a pair of elongate arms—a first arm 12 and a second arm 14. The arm 12 has a proximate portion 16 and a distant portion 18. The arm 14 has a proximate portion 20 and a distant portion 22. The proximate portions 16 and 20 form a hinge end of the tongs 10. The distant portions 18 and 22 curve inwardly and converge when a user needs to grasp an object.

The proximate portion 16 comprises a pair of curved, or arcuate walls 24, 26, which extend outwardly from an outer surface 15 of the arm 12, A groove 30 extends between the walls 24, 26, with the inner surfaces of the walls 24, 26 defining the walls of the groove 30. A bottom 32 of the groove 30 carries a magnet member 34 secured adjacent a proximate, or hinge end 36 of the arm 12. As can be seen in FIG. 4, the magnet member 34 is secured in the proximate portion 16 at a location close to the end 36, where the arm 12 has a reduced thickness as compared to the portion 37, where the arm 12 has a greater thickness. As will be described below the proximate end 36 of the first arm 12 diverges from the proximate end 48 of the second arm 14.

The proximate portion 20 of the second arm 14 comprises a main part 40 that is configured and sized to fit at least in part, within the groove 30 of the proximate portion 16. The main part 40 comprises a pair of outwardly extending shoulders 42, 46, which extend from a proximate, or hinge end 48 of the proximate portion 20 towards a middle portion 50 of the second arm 14. The shoulders 42, 46 are formed on walls 52, 54 of the proximate portion 20.

Each of the shoulders 42, 46 has an arcuate configuration, which allows a rocking movement of the walls 24, 26, respectively on the shoulders 42, 46. If desired, the curvature of the shoulders 42, 46 may have a radius similar to the curvature of the bottom surfaces of the walls 24, 26, although it is not an absolute requirement.

A magnet member 60 is secured on an inner surface 62 of the main portion 40. The location of the magnet member 60 is close to the hinge end 48, which has a reduced thickness as compared to the thickness of the second arm 14 at a point 47. The end 48 is curved in a direction opposite to that of the curved portion 16 of the first arm 12 and in a direction opposite to the curve of the hinge end 36. The magnet member 60 has a polarity opposite to the polarity of the magnet member 34 such that the magnet members 34 and 60 attract each other with their magnetic flux causing the magnets to come into contact when the proximate portions 16 and 20 are brought together.

Since the portions 16 and 20 diverge, and the magnet members 34 and 60 are secured close to the hinge ends 36, 48, the engagement of the magnet members 34 and 60 will cause the distant ends 18 and 22 to stay in an open position. Conversely, when the ends 18 and 22 are in a closed position, the divergent hinge ends 34 and 48 are away from each other.

As can be seen in FIGS. 3 and 6, the arms 12 and 14 are detachably engaged with each other when the magnet members 34 and 60 join to form a hinge point. The main portion 40 of the arm 14 fits inside the groove 30, with the bottom of the walls 24, 26 resting on the shoulders 42, 46. The arms 12 and 14 are connected through the magnet members 34, 60 while the distant portions 18 and 22 of the tongs 10 are spread apart, as shown in FIGS. 1 and 6. In this position, a user may rest his thumb on the middle portion of one of the arms, for instance the arm 14, while grasping the arm 12 with the palm and the four other fingers. Of course, the user may use the thumb to contact the arm 12, if desired.

As can be seen in the drawings, the middle portion 70 of the arm 12 and the middle portion 72 of the arm 14 are outwardly curved to make it easier for the user to grasp and squeeze the arms 12 and 14 of the tongs 10.

When a user needs to grasp an object using the tongs 10, the user applies a slight pressure on the arms 12 and 14 of the tongs 10 causing the magnets 34 and 60 to disengage, as shown in FIG. 5. Since the main part 40 is fitted within the groove 30, the proximate portions 16 and 20 do not separate but rather pivot. The user can then pick up an item with the distant ends 18, 22 grasping an object. The user retains pressure on the arms 12 and 14 while handling the object.

Once the object has been deposited in the desired location the user stops applying pressure on the tong arms 12 and 14. The magnet members 34 and 60 while still generating a magnetic flux, cause the proximate ends of the arms to spring back together to a position shown in FIGS. 3 and 6. When the arms are biased back into an open position the bottom surfaces of the walls 24, 26 ride along the shoulders 42, 44.

If desired, each arm 12 and 14 can be provided with an inwardly curved part 74, 76 located between the proximate portions 16, 20 and distant portions 18, 22, respectively. When the arms 12 and 14 are in a closed position, as shown in FIG. 7, the inwardly curved parts 74, 76 contact each other. A window 78 is formed between the distant ends 80, 82 allowing a user to pick up larger items if desired. The items will be retained by the portions of the arms 12, 14 in the location between the distant ends 80, 82 and curved parts 74, 76.

The tongs 10 can be easily disassembled by pulling the arms 12 and 14 apart against the resistance of the magnetic flux generated by the magnet member 34 and 60. When pulled apart, the arms 12 and 14 can be easily cleaned or sanitized with conventional tools. Since there is not spring at the hinge end, as is common with other types of tongs, the entire surfaces of the arms 12 and 14 are accessible for thorough cleaning.

The arms 12 and 14 can be stored side by side with the magnet members 34 and 60 facing opposite directions so as not to come into contact with each other. In this position, the arms 12 and 14 occupy minimal space, whether in a kitchen cabinet drawer or in an upright storage container.

If desired, the bottom 32 of the groove 30 can be formed flat, as shown in phantom lines in FIGS. 3-5, and the magnet member 34 can be placed on the flat bottom surface. The tongs can be formed from any non-reactive material, such as wood, plastic, metal, etc. The magnet members can be glued or otherwise securely attached to the arms of the tongs so as not to be easily removed when the arms are pulled apart. One of the two magnets may be replaced by a piece of ferromagnetic material.

While one preferred embodiment of the invention is for tongs, various types of magnetic hinged utensils are contemplated. The invention is not limited to the tongs shown in the drawings. Many changes and modifications can be made in the design of the present invention without departing from the spirit thereof. I therefore pray that my rights to the present invention be limited to the scope of the appended claims.

I claim:

1. A tongs device comprising:
   a first arm having a first arm proximate portion provided with a groove defined between a pair of outwardly extending arcuate walls and a first magnetic member secured in a bottom of said groove;
   a second arm having a second arm proximate portion and a second magnetic member secured on said second arm proximate portion, said second arm proximate portion being formed with a main part that is configured as a solid body sized and shaped to fit at least in part in said groove, wherein said second arm further comprising a contact surface, a non-contact surface, and arcuate transverse shoulders having curvature complimentary to the arcuate walls, said arcuate transverse shoulders extending outwardly from and along, opposite sides of the main part between the contact surface and the non-contact surface, said first arm being detachably pivotally secured to said second arm, and said first magnet member being selectively engageable with the second magnet member when the arms are in an open position.

2. The device of claim 1, wherein bottom surfaces of said arcuate walls rest on said shoulders when the first arm is engaged with the second arm.

3. The device of claim 1, wherein each of said pair of arcuate walls has a curved bottom surface.

4. The device of claim 1, wherein the first arm comprises a first arm proximate end curved in a direction away from an inner surface of the first arm, and wherein said first magnetic member is secured adjacent to the first arm proximate end.

5. The device of claim 4, wherein the second arm has a second arm proximate end curved in a direction away from the direction of the first arm, and wherein said second magnetic member is secured adjacent to the second arm proximate end.

6. The device of claim 1, wherein said first arm and said second arm are pivotally movable in relation to each other when the first magnet member and the second magnet member are separated from a locking engagement.

7. The device of claim 1, wherein said first arm comprises a curved middle portion and the second arm comprises a curved middle portion, and wherein an opening is defined between respective said middle portions of the first arm and the second arm and distant ends of the first arm and of the second arm when the arms are in a closed position.

8. The device of claim 1, wherein said first arm comprises a first arm hinge end, said second arm comprises a second arm hinge end, and wherein the first arm hinge end and the second arm hinge end divergently curve from each other.

9. A tongs device for manually grasping items, comprising:
a first elongate arm and a second elongate arm pivotally joined together with a pair of magnetic members, the first elongate arm and the second elongate arm pivot between an open position when the magnetic members are joined together and a closed position when the magnetic members are separated, said first elongate arm being provided with a first arm proximate portion having a groove defined between spaced-apart parallel walls, wherein one of said pair of magnetic members secured to a bottom of said groove, said second elongate arm being provided with a second arm proximate portion with a reduced size main part formed as a solid body, a contact surface and a non-contact surface, and a pair of shoulders formed on opposite sides of the main part between the contact surface and the non-contact surface, and wherein said parallel walls are configured to rest on said shoulders when the arms are in an open position, and furthermore, wherein a second of said pair of magnetic members being secured on said second arm proximate portion.

10. The device of claim 9, wherein said parallel walls are configured as outwardly curved walls, and wherein said shoulders cooperate with said parallel walls for pivoting the first elongate arm and the second elongate arm between the open and closed positions and limit extension of the second proximate portion into the groove of the first proximate portion.

11. The device of claim 9, wherein said first elongate arm comprises a first curved middle portion and the second elongate arm comprises a second curved middle portion, and wherein an opening is defined between respective said curved middle portions of the first elongate arm and the second elongate arm and distant ends of the first elongate arm and of the second elongate arm when the elongate arms are in a closed position allowing a user to grasp objects with parts of the first elongate arm and the second elongate arm spaced from the distant ends of the first elongate arm and the second elongate arm.

12. The device of claim 9, wherein said first elongate arm and said second elongate arm have outwardly curved diverging hinge portions and inwardly curved converging distant grasping portions.

13. A kitchen tongs device, comprising a first elongate arm and a second elongate arm pivotally joined together with a pair of magnetic members, the first elongate arm and the second elongate arm pivoting between an open position when the magnetic members are joined together and a closed position when the magnetic members are separated, and wherein the first elongate arm comprises a first arm proximate portion, said first arm proximate portion being provided with a groove having a bottom surface secured to one of said pair of magnetic members and a pair of parallel outwardly convex walls partially defining the groove, and the second elongate arm comprises a contact surface, a non-contact surface, a second arm proximate portion formed with a solid main part that fits at least in part in said groove, and transverse shoulders extending outwardly from and along the main part between the contact surface and the non-contact surface, said shoulders limiting extension of the main part into the groove, and furthermore, wherein a second of said pair of magnetic members being secured on said second arm proximate portion.

14. The device of claim 13, wherein bottom surfaces of said convex walls rest on said shoulders when the first elongate arm is engaged with the second elongate arm.

15. The device of claim 14, wherein each of said pair of convex walls has an outwardly convex a curved bottom surface.

16. The device of claim 13, wherein the first arm comprises a proximate end having a reduced thickness.

17. The device of claim 13, wherein the second arm has a second arm proximate end having a reduced thickness.

18. The device of claim 13, wherein said first elongate arm and said second elongate arm are pivotally movable in relation to each other when the first magnetic member and the second magnetic member are separated from a locking engagement.

19. The device of claim 13, wherein said first elongate arm comprises a first curved middle portion and the second arm comprises a second curved middle portion, and wherein an opening is defined between respective said curved middle portions of the first elongate arm and the second elongate arm and distant ends of the first elongate arm and of the second elongate arm when the arms are in a closed position allowing a user to grasp objects with parts of the first elongate arm and the second elongate arm spaced from the distant ends of the first elongate arm and the second elongate arm.

* * * * *